United States Patent [19]
Rumberger et al.

[11] Patent Number: 5,337,974
[45] Date of Patent: Aug. 16, 1994

[54] WING PIVOT STRUCTURE

[75] Inventors: William E. Rumberger, Newtown Square, Pa.; Wayne S. Steffier, Huntington Beach, Calif.

[73] Assignee: The Boeing Company, Seattle, Wash.

[21] Appl. No.: 868,508

[22] Filed: Apr. 15, 1992

[51] Int. Cl.5 ............................................. B64C 3/56
[52] U.S. Cl. ...................................... 244/49; 244/46; 244/39; 244/7 R; 416/142
[58] Field of Search ............... 244/46, 39, 45 R, 49, 244/7 R, 7 A, 7 C, 2; 416/142, 143

[56] References Cited

U.S. PATENT DOCUMENTS

| | | | |
|---|---|---|---|
| 2,679,364 | 5/1954 | Sforza Del Pesaro | 244/49 X |
| 3,142,459 | 7/1964 | Baetke | 244/46 X |
| 3,490,720 | 1/1970 | Girard | 244/7 |
| 3,510,088 | 5/1970 | Bird | 244/46 |
| 3,559,924 | 2/1971 | Jochner | 416/142 |
| 3,971,535 | 7/1976 | Jones | 244/46 |
| 4,132,374 | 1/1979 | Abell | 244/46 |
| 4,691,878 | 9/1987 | Vaughan et al. | 244/7 R |
| 4,998,689 | 3/1991 | Woodocck | 244/46 |

FOREIGN PATENT DOCUMENTS

| | | | |
|---|---|---|---|
| 2426061 | 12/1975 | Fed. Rep. of Germany | 244/46 |
| 0910792 | 11/1962 | United Kingdom | 244/46 |

*Primary Examiner*—Joseph F. Peters, Jr.
*Assistant Examiner*—Christopher P. Ellis
*Attorney, Agent, or Firm*—Jones, Tullar & Cooper

[57] ABSTRACT

An aircraft wing pivot structure is described which provides a flexible ring attached to the aircraft wing at flexible wing attachment points by spherical bearings. The ring is attached to the fuselage of the aircraft by pins fixed to the fuselage and fittings partially enclosing sliding shoes formed at the bottom edge of the ring to allow rotation of the wing. The wing is locked in the flight position by retractable pins connected to the primary fuselage attachment fittings. The ring is a unitary stainless structure which accepts wing strains induced by flight loads by flexing at the wing attachment points. The use of a flexible ring eliminates truss-like members mounted on spherical bearings used in conventional designs. The elimination of a substantial number of components by the use of a flexible ring substantially reduces the weight of the aircraft and improves the reliability.

17 Claims, 8 Drawing Sheets

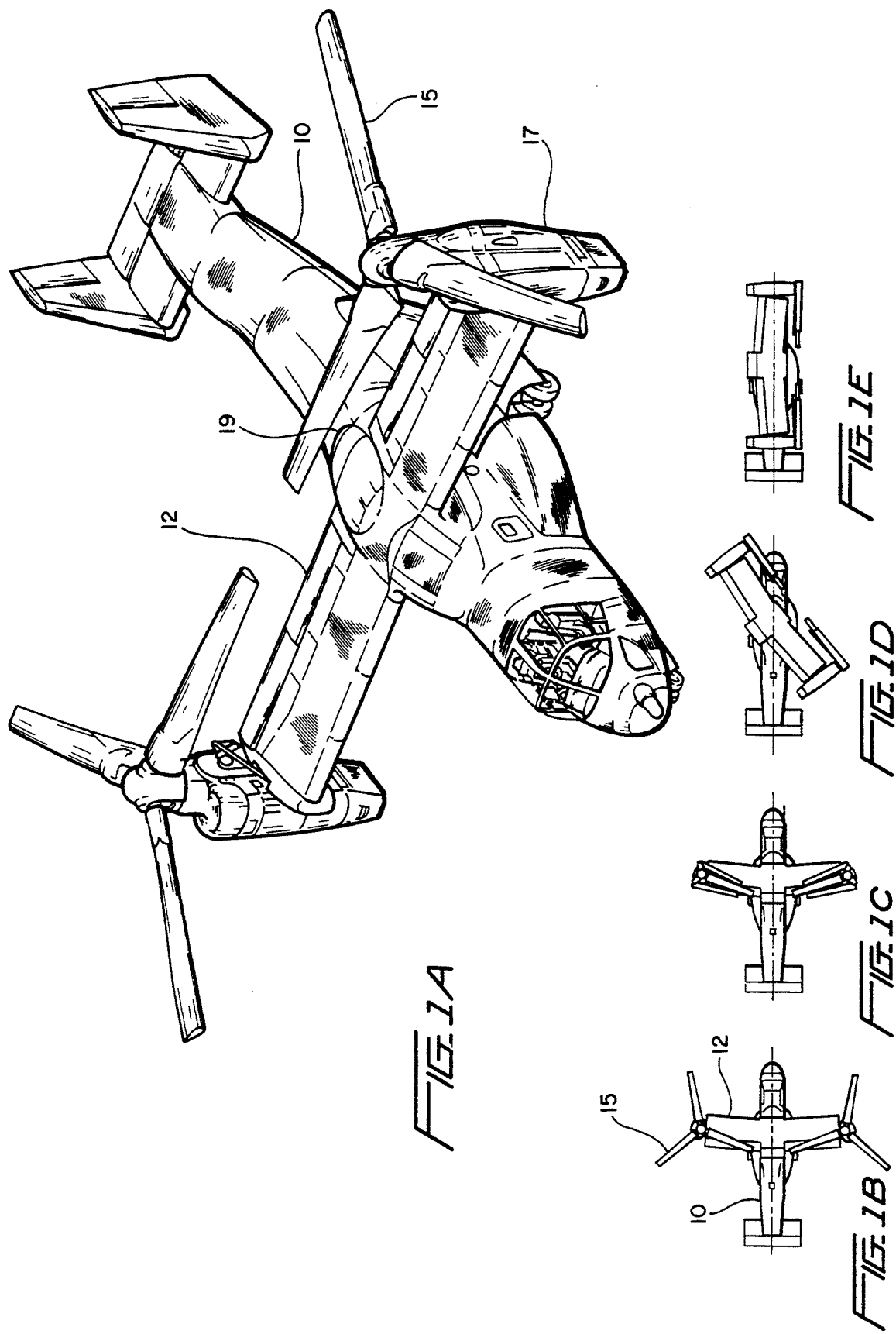

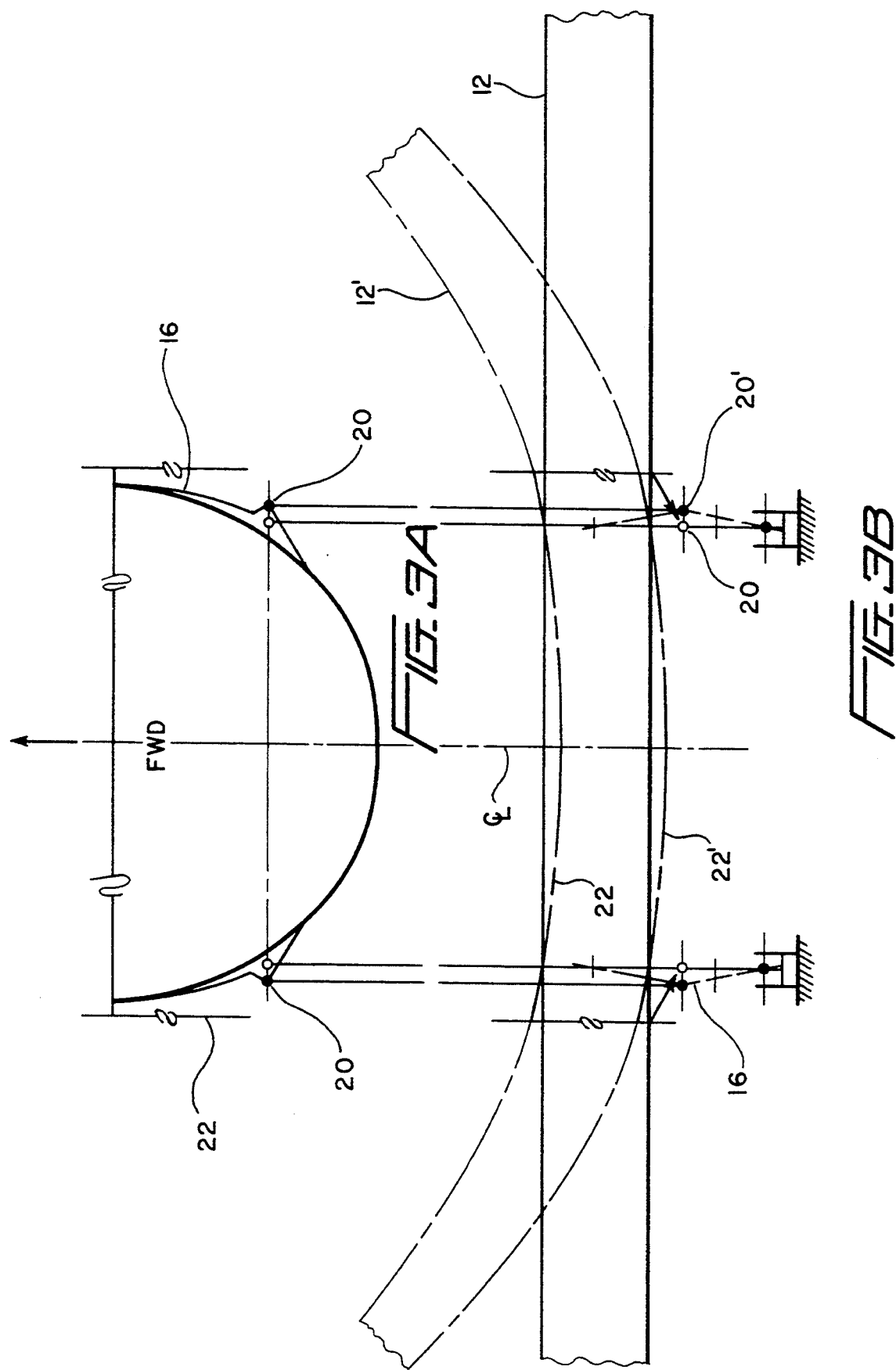

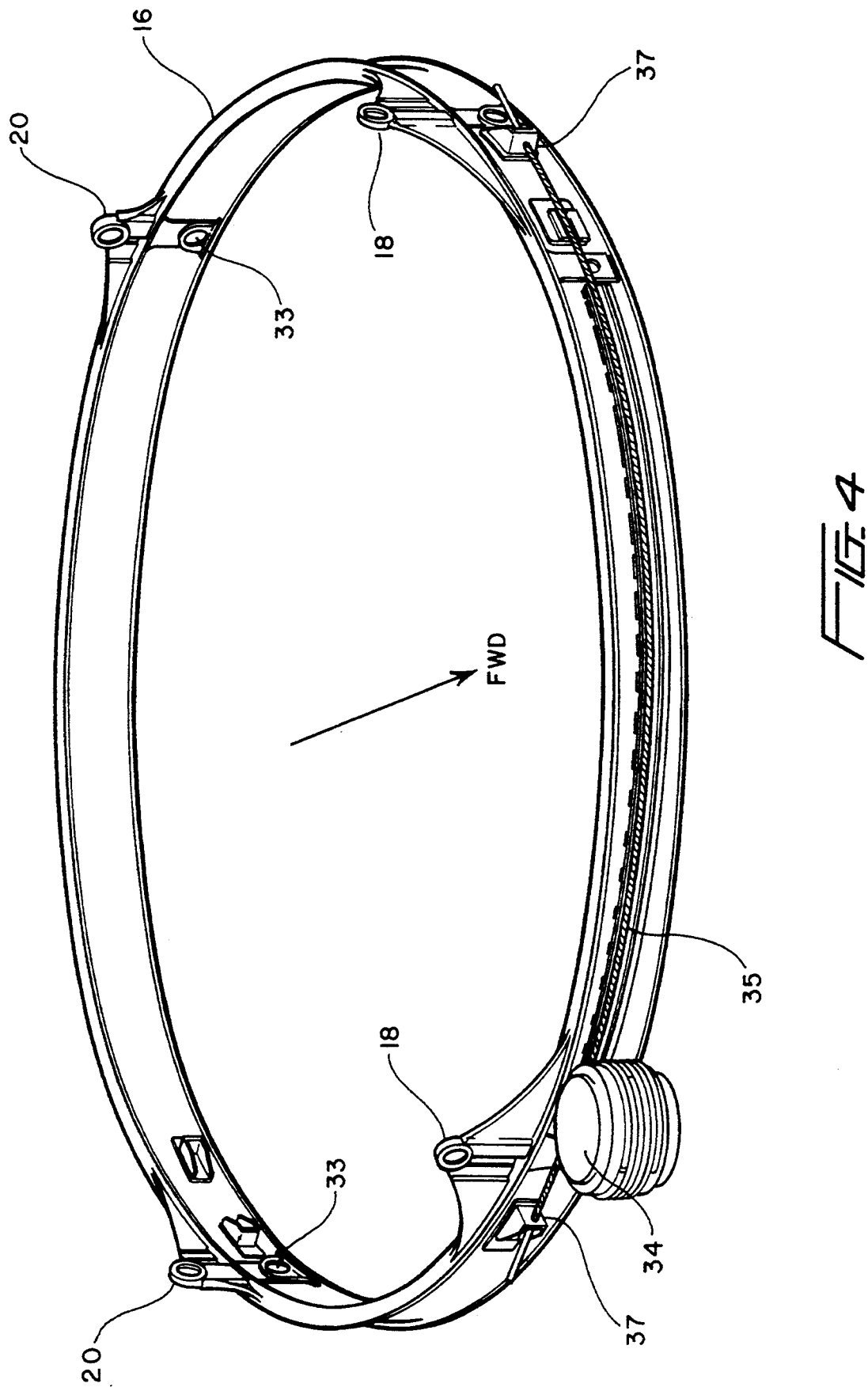

WING PIVOT STRUCTURE

BACKGROUND OF THE INVENTION

This invention relates in general to fixed wing aircraft and in particular to fixed wing aircraft in which the aircraft is provided with structural elements that allow the wing to be rotated about a generally vertical axis. In the prior art devices, the wing pivot structure is usually intended to allow rotation of the wing during flight in order to change the flight angle of the leading edge of the wing with respect to the line of flight of the aircraft. In these applications of wing rotation devices, the angle of rotation is limited to a few degrees. Examples of these structures are shown in U.S. Pat. Nos. 3,510,088, 3,971,088 and 4,132,374.

The present invention is intended for use in an aircraft in which the wing is to be rotated only in non-flight conditions. In particular, the invention is described in connection with its use on a fixed wing aircraft intended for use on an aircraft carrier where it is necessary to change the wing position in order to reduce the overall size of the aircraft to allow it to be carried on an elevator to the lower hangar decks of the ship and to minimize the hangar space required for storage of the aircraft.

In addition to providing means for rotation of the wing, the rotating structure must also carry wing flight loads and, more importantly, it is most desirable that the structure also absorb the wing box strains resulting from flight loads rather than require the fuselage airframe to absorb these reversing motions. In order to absorb wing box strains, conventional wing pivot structures of the prior art require a plurality of links between the wing box and the fuselage which are provided with spherical or universal bearings at their ends to allow the wing box to flex relative to the fuselage. This series of linkages adds considerable weight to the aircraft and increases its complexity. Increased complexity introduces multiple wear points, thus generally reducing overall the reliability of the entire aircraft.

The present invention overcomes these disadvantages by attaching the wing to the fuselage by means of a simple unitary ring which is assembled to form an integrated structure with the wing box structure. The ring is allowed to flex at its wing attachment points an amount sufficient to absorb the expected wing box strains. The ring is attached to the fuselage structure by four primary attachments assemblies which may be disconnected from the ring to allow wing rotation. The majority of the vertical flight loads are carried directly by the column-like supports which are integrated into the unitary ring between the primary wing and fuselage attachment points. Secondary attachment assemblies on the fuselage provide additional in-plane flight load paths and support for rotation of the ring by means of shoes attached to the fuselage and connected in sliding engagement to the ring. In-plane loads are reacted by the ring in a tangential direction in which the ring is inherently very stiff as compared to the radial flexibility of the wing attachment points of the ring.

Thus it can be seen in the following detailed description of the invention, that there is herein described a structure for allowing rotation of an aircraft wing during non-flight conditions which requires a minimum of parts thus reducing the aircraft overall weight while increasing the reliability of the entire machine.

SUMMARY OF THE INVENTION

An aircraft wing pivot device is described which utilizes a unitary ring structure to attach the wing to the fuselage through the wing box. The ring is made radially flexible at the wing attachment points to allow the ring to absorb wing strains resulting from flight loads. The ring carries the primary flight loads directly in a columnar attachment point and allows wing rotation by providing removable primary attachment assemblies on the fuselage and secondary attachment assemblies for rotational support. In addition, the ring, along with its spherical bearing attachments at the wing box and the fuselage attachment points, creates a unified structure which is sufficiently flexible to absorb wing strains from flight loads.

BRIEF DESCRIPTION OF THE DRAWINGS

FIG. 1A is an overall view of an aircraft utilizing the invention.

FIGS. 1B-1E show the sequence of the wing pivot movement according to the invention.

FIGS. 3A and 3B are schematic views demonstrating wing flexure.

FIG. 4 is a perspective view of the ring of the invention.

DETAILED DESCRIPTION OF THE PREFERRED EMBODIMENT

Referring now to FIG. 1A, there is shown an example of an aircraft on which the invention may be used. This example is a tilt rotor aircraft in which the main rotors 15, shown in the vertical flight position, can be rotated along with the engines 17 to a forward facing position and the aircraft operated as a fixed wing turbo-prop aircraft. With the rotors in the vertical flight position as shown in FIG. 1A, the aircraft operates in the same manner as a tandem helicopter. The aircraft has a fixed wing 12 mounted on the fuselage 10 and is provided with a pivot mechanism shown schematically at 19. Because of the two flight modes possible with this aircraft, it can operate without extended runways an is therefor useful as a carrier based fixed wing aircraft which may be used for air-sea rescue, as a troop or cargo carrier for off-shore deployment and as an antisubmarine aircraft. Aircraft carriers require that all aircraft be transportable on shipboard elevators to allow them to be stored below deck when not in use. In addition, since hangar space is at a premium aboard such vessels, all aircraft aboard must be able to reduce the space required for storage. In the case of the aircraft of FIG. 1A, the rotors are able to fold inboard and the wing can be stowed in a position parallel to the longitudinal axis of the fuselage by means of the wing pivot mechanism described below. Referring now to FIGS. 1B–1E the stowing sequence is shown. From the vertical flight configuration shown in FIG. 1B, the rotors are folded inboard as shown in FIG. 1C. Next, the wing is rotated 90° to lie atop and parallel to the longitudinal axis of the aircraft. The wing is shown partially rotated in FIG. 1D and the rotation is completed in FIG. 1E. The details of the wing pivot structure are discussed below in connection with FIGS. 2–8.

Figure 2B:
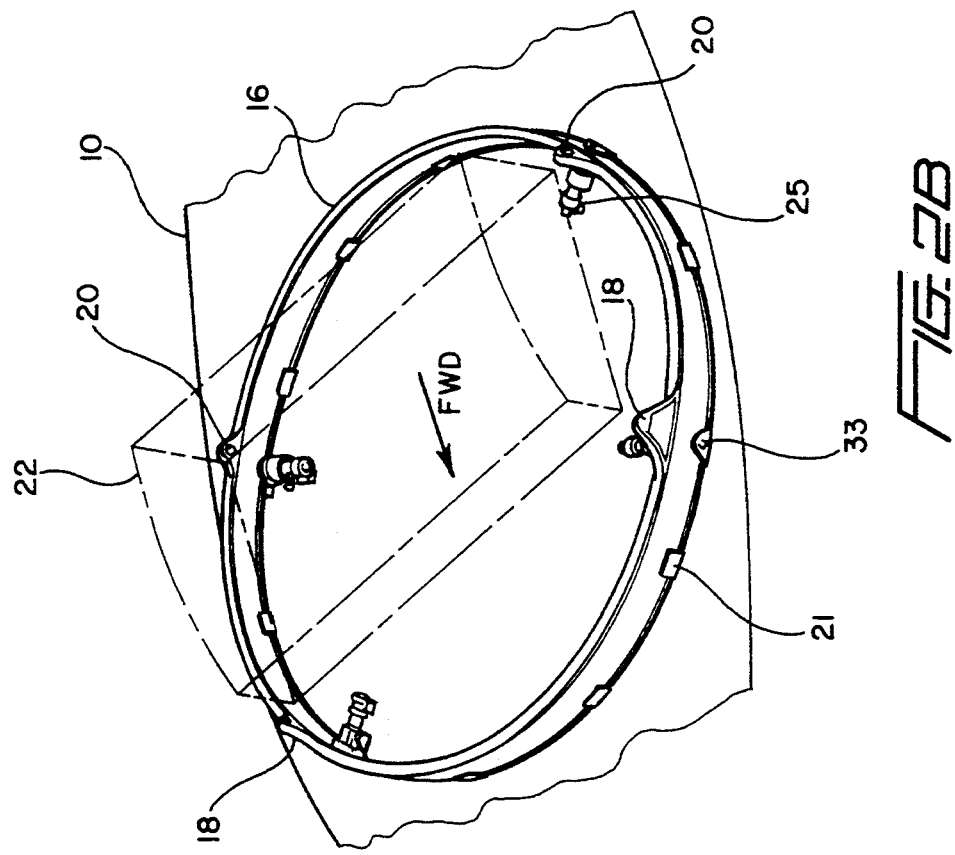
FIG. 2B is a perspective schematic view of the wing pivot device of the invention.
Figure 2A:
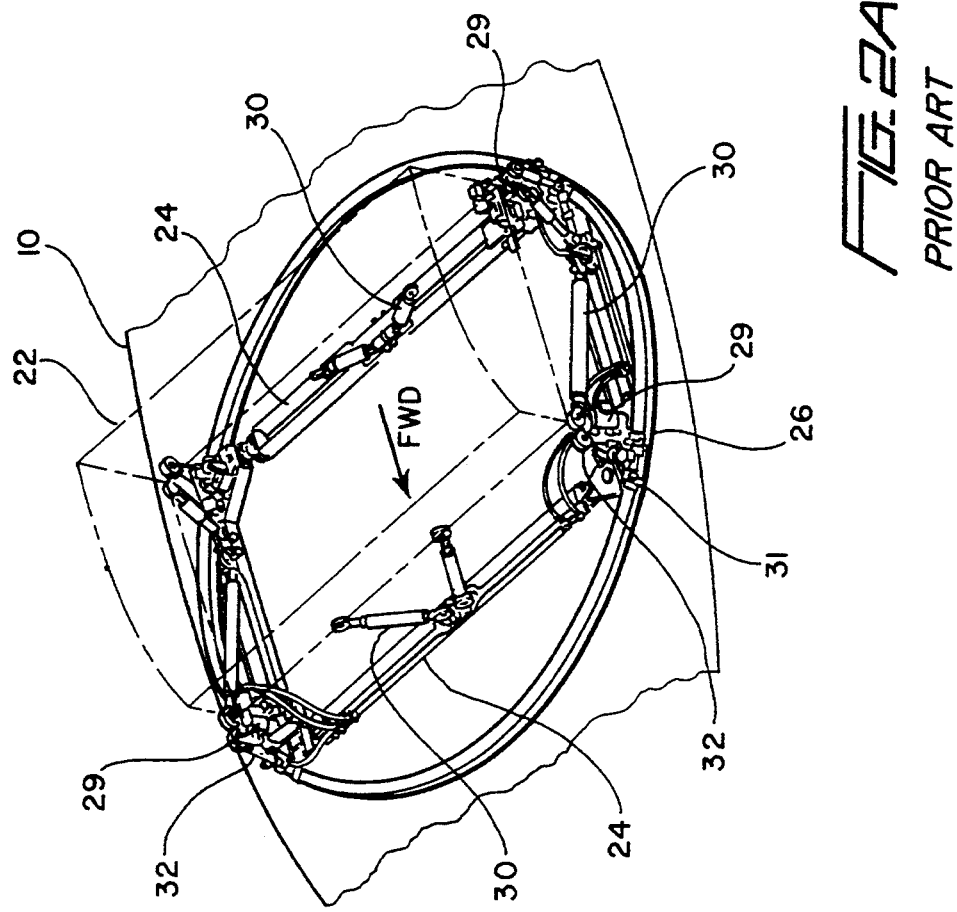
FIG. 2A is a perspective schematic view of a prior art wing pivot device.

Referring now to FIG. 2A, there is shown a wing pivot structure according to the prior art. The wing box 22 is connected to the wing extension frame structure 24 through a series of linkage members 30. A total of 8 links are provided around the perimeter of the frame member 24 to absorb wing strains from flight loads. Each link is attached to the wing box and the frame 24 by means of spherical bearings of conventional design (not shown). In addition, lift links 32 and shoes 31 are provided at each corner of the frame-wing box interface and, along with a portion of the ring 26, are designed to be the primary carriers of vertical wing flight loads. These links provide the wing to fuselage connection and are also attached at both ends by means of spherical bearings, making a total of 12 links requiring 24 such bearings. The frame 24 is connected to the fuselage 10 through pins removable 29 which extend into fittings in the fuselage.

FIG. 2B shows a comparable view of the same functional structure according to the present invention. In this device, the wing box 22 is attached directly to a unitary stainless steel ring and is an intricate part of the ring structural system. The ring 16 is attached at four primary wing attachment points. A stainless steel is given only as an example. The ring can also be fabricated of titanium or similar metals or of composite materials. Such a ring has been made of a composite material comprised of graphite, glass and epoxy in a composite matrix. The forward wing attachment points are shown at 18 and the rear wing attachment points at 20. The ring is attached to the fuselage at four primary fuselage attachment points 33 by means of the fuselage attachment assemblies. These fuselage attachment assemblies are shown in greater detail in connection with the description of FIGS. 4–8 below. Primary attachment to the fuselage is by means of retractable lock pins 25 in the primary fuselage attachment assemblies. These pins lock the wing in flight position when they are inserted in the matching holes in the fuselage attachment points 33 on the lower edge of the ring 16. These pins may be withdrawn into the fuselage attachment points by hydraulic cylinders or similar actuators when the wing is to be rotated. The secondary fuselage attachment shoes are shown at 21. These attachment assemblies are in the form of shoes 21 fixed to the fuselage 10 and attached to the ring 16 in a manner to allow the lower ring flange 55, shown in FIG. 8, to slide in the shoe 21 during wing rotation. These shoes, shown in greater detail in FIGS. 8A and 8B, contain sliders 48 made of a sintered bronze and dry lubricant compound which provides the low sliding friction required for wing rotation. One of the primary fuselage attachment assemblies is shown in FIG. 8A. These assemblies also provide sliders 48 between the ring and fuselage and are made of the same material.

Referring now to FIGS. 3A and 3B, there is shown a schematic diagram of the wing strains encountered in flight of the aircraft. FIG. 3A is a schematic plan view of the wing to ring attachment. The ring 16 is attached to the wing box 22 and the fuselage 10 as described above in connection with FIGS. 2A and 2B at the rear attachment points 20. The wing box 22' and the wing 12' are shown in maximum deflected flight position by the dotted line figure. The wing box 22 and the wing 12 are shown in the non-deflected flight position by the solid lines. As can be seen by the schematic, the wing attachment points, shown at 20 in the non-deflected flight position, move to the point shown at 20' when the aircraft is in maximum deflected flight. Typically, these points can move approximately 0.15 inches between the two conditions described. However, these deflections will be opposite in the case, for example, of a hard landing where the wing strain will be in the opposite direction from that caused by flight induced loads. It is desirable that these wing strains be absorbed in the wing attachment structure rather than in the aircraft fuselage. As can be seen in the prior art device described in connection with FIG. 2A above, conventional design provides for this movement with a series of links attached at both ends to the wing and fuselage by spherical bearings. In the present invention these strains are absorbed by the mounting ring 16 in limited flexure of the wing attachment points 18 and 20. In the case of a hard landing, especially in an aircraft with wing-tip mounted engines as shown in the example of FIG. 1A, the flexure will be in the opposite direction from that shown in FIGS. 3A and 3B.

Referring now to FIGS. 4–8, the details of the flexible ring are more clearly shown. In FIG. 4 the ring 16 is shown in a perspective view. The forward wing attachment points are shown at 18 and the rear wing attachment points at 20. In the preferred embodiment shown for the aircraft of FIG. 1A, the attachment points are slightly different in order to accommodate the particular structure of the example aircraft. The fuselage attachment points 33 are shown in greater detail in FIGS. 5–8 below. To rotate the ring, there is shown a mechanism for this purpose. A servo motor and capstan of any known design is shown at 34 in FIG. 4. A cable 35 is wrapped around the capstan 34 and the ring 16 and is attached to the ring at cable attachment points 37. The motor-capstan is attached to the aircraft fuselage and rotates the ring when the capstan pulls the cable in either direction.

Figure 5A:
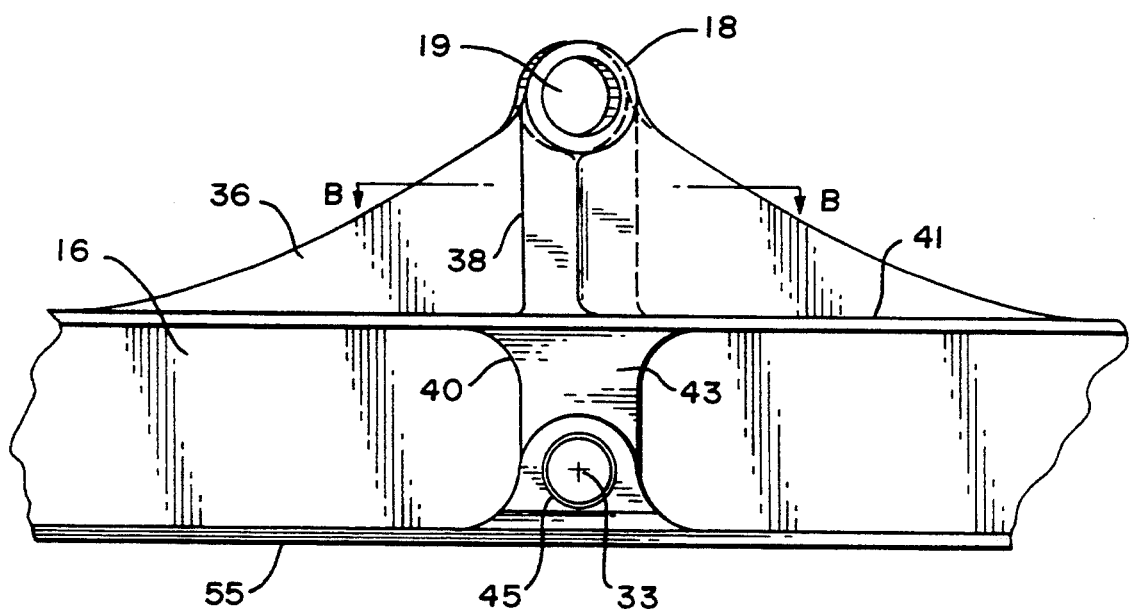
FIG. 5A is an enlarged view of a forward wing attachment point.
Figure 5B:
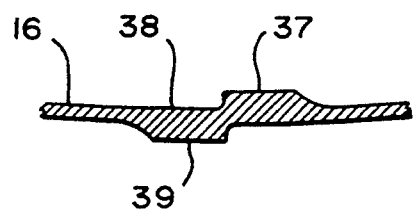
FIG. 5B is a sectional view taken along line B—B of FIG. 5A.
Figure 8A:
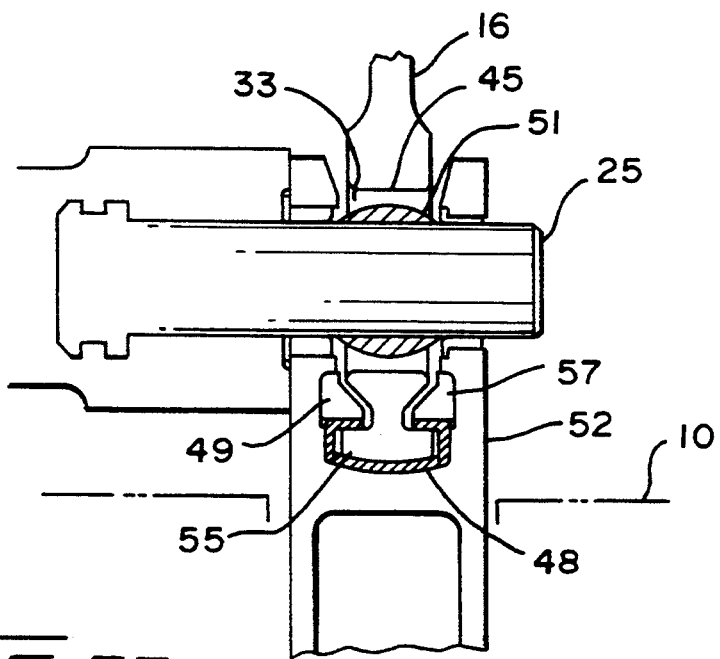
FIG. 8A is a sectional view of one of the primary fuselage attachment assemblies.
Figure 8B:
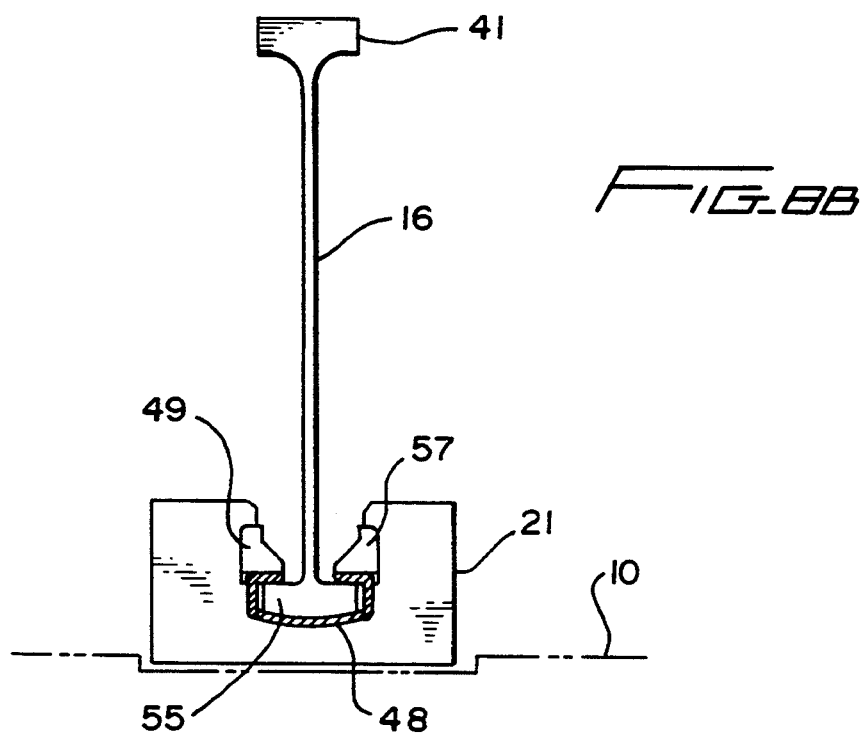
FIG. 8B is a sectional view of one of the secondary fuselage attachment assemblies.
Figure 8C:
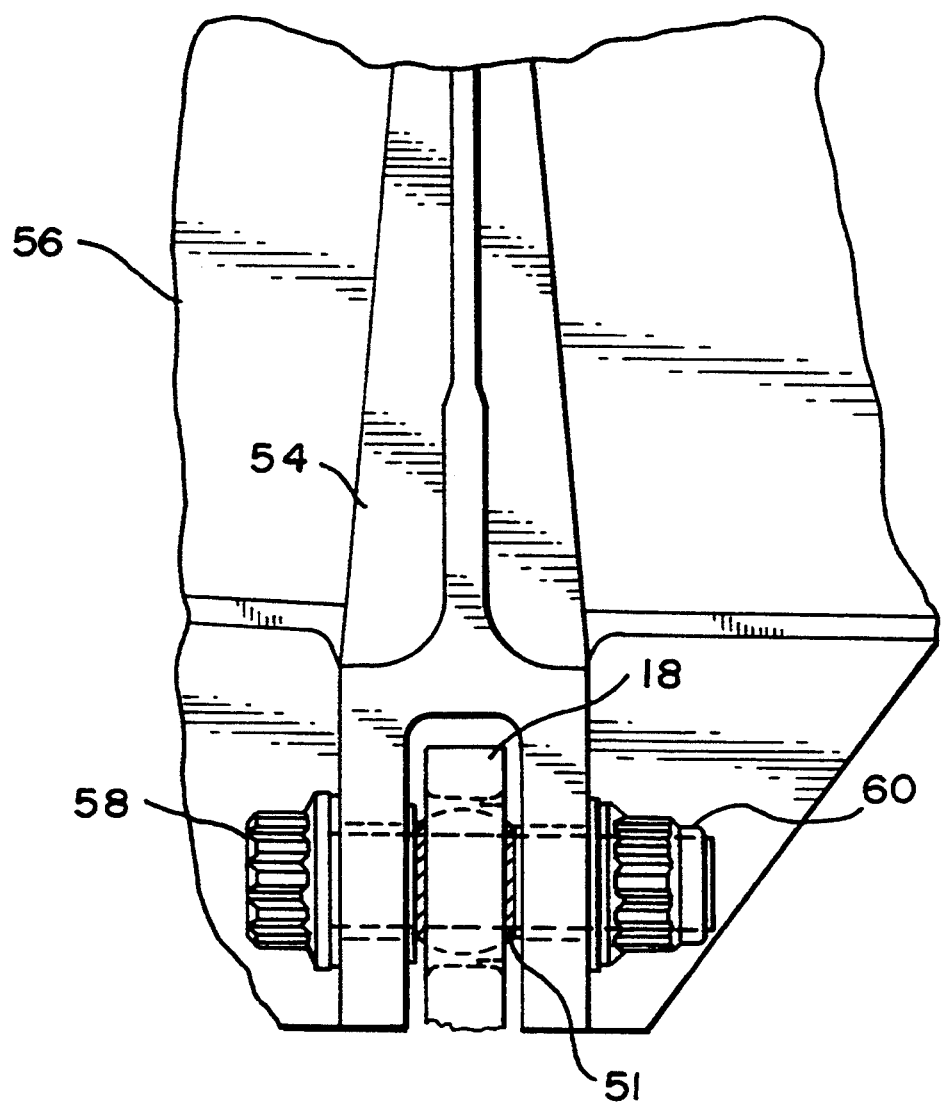
FIG. 8C is a sectional view of one of the wing attachment assemblies.

Referring now to FIG. 5A, there is shown an enlarged, detail drawing of the forward wing attachment point 18. The forward wing attachment point 18 is supported by the ring extension web 36 which extends from the attachment point 18 to the ring 16. An opening 19 is provided to accept a spherical bearing of any known type. A bolt 58 is inserted in this bearing and the wing box attachment lug 54 as shown in FIG. 8C which makes the wing box-ring attachment assembly. The column 38 supports the attachment point directly from the ring-fuselage attachment 33 to the wing attachment. Because the direction of the wing attachment bolts is not perpendicular to the ring tangent, the column 38 is made in two columnar portions as shown in the sectional view of FIG. 5B. The columnar portions 37 and 39 provide the cross sectional strength to withstand the lift loads and strains of the wing in the flight condition through the canted attachment point. At the lower edge of the ring 16 there is shown one of the four primary fuselage attachment points 33. The web 40 is a thickened web which forms a continuation of the upper column 38. An opening 45 is provided for a spherical bearing of any known type to accept the removable lock pin 25 shown in FIG. 2B and 8A which completes one of the four primary fuselage attachment assemblies.

Figure 6A:
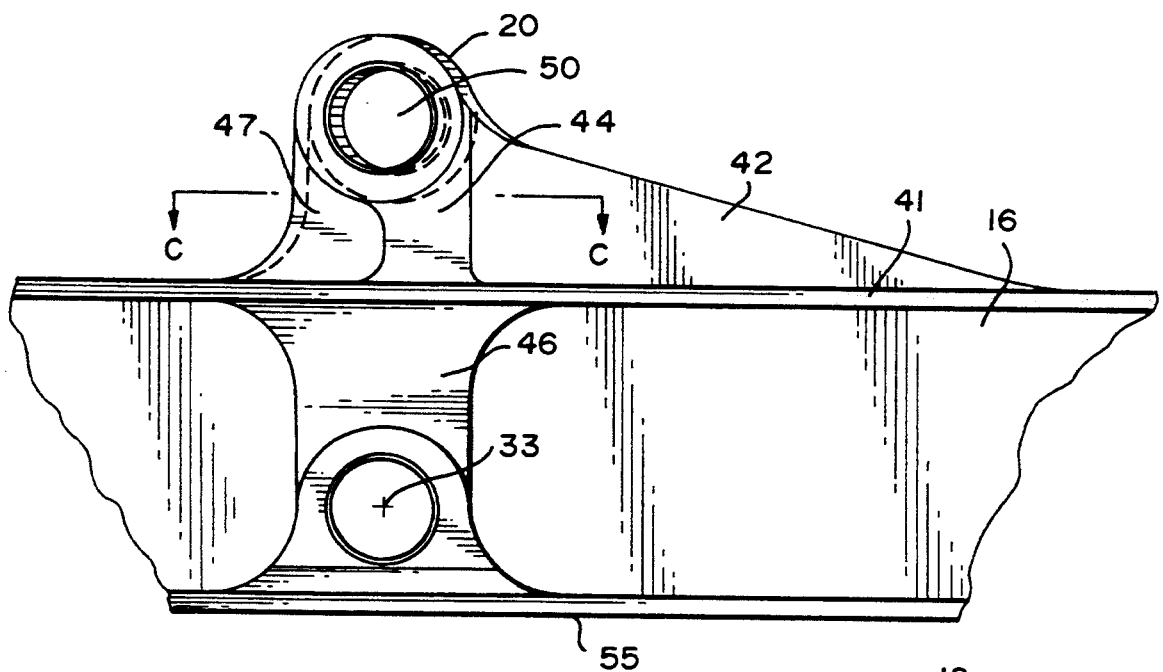
FIG. 6A is an enlarged view of the aft wing attachment point.
Figure 6B:
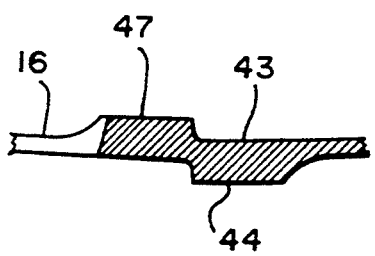
FIG. 6B is a sectional view taken along line C—C of FIG. 6A.

FIG. 6A in an enlarged view of one of the rear wing and fuselage attachment points of the ring 16. The wing attachment point 20 is supported by a web extension 42 at its aft side and a short vertical web member 47 at the forward side. An opening 50 is provided in the attachment point 20 for a spherical bearing to accept the bolt 58 which will attach to the wing box attachment lug 54. The attachment point 20 is connected to the ring 16 by webs 43 and 47. This web pair 44 is shown in FIG. 6B in a cross section taken along line C—C in FIG. 6A. The wing attachment point 20 is connected to the fuselage attachment point 33 on the bottom edge of the ring 16 by web 46. The primary fuselage attachment point 33 is the same as that described in connection with FIG. 5 above.

Figure 7:
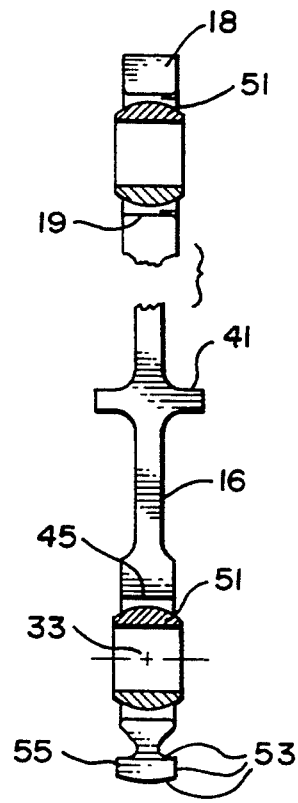
FIG. 7 is a sectional view taken along line A—A of FIG. 5A.

FIG. 7, is a sectional view of the forward attachment point 18 taken along line A—A of FIG. 5A. As can be seen, the ring 16 provides the wing attachment point 18 and spherical bearing 51 in opening 19 at its upper edge. As can be seen in FIG. 8C, the attachment to the wing structure is made in a conventional manner. A bolt 58 is inserted through the wing lug 54 and the wing attachment member 18 and secured by a nut 60. The wing lug is fastened to the wing 56 in any known manner. Referring back to FIG. 7, there is shown the upper ring flange 41 and the lower ring flange 55. These ring flanges extend continuously around the perimeter of the ring. A primary fuselage attachment point 33 is shown with spherical bearing 51 installed in opening 45 at its lower edge. At the extreme lower edge of the ring 16, a continuous sliding surface 53 is formed on lower flange 55 around the perimeter of the ring. This sliding surface is partially enclosed by the primary and secondary attachment assembly shoes 52 and 21 which are attached to the fuselage and allow the ring, held by retainers 49 and 57 to be rotated on the fuselage as the ring moves through sliding pads 48 mounted in the shoes. This feature is also shown in FIG. 8A which is an enlarged, sectional view one of the primary fuselage attachment assemblies showing the ring in the flight-ready position. In this Figure, one of the primary fuselage attachment points 33 is shown at the lower edge of the ring 16. The opening 45 has installed, a spherical bearing 51 of any known type. The retractable pin 25 is shown in the position to lock the wing in the flight position. The sliding pad 48 is retained by shoe 52 which is attached to the fuselage 10. There is sufficient radial clearance between the sliding pad 48 and the ring 16 to allow the ring to move within the shoe assembly as the ring is rotated after withdrawal of pin 25. The sliding pad is fabricated of a sintered bronze material and dry lubricating compound which requires no additional lubrication in this application. When the ring is in the flight position with the locking pins 25 in the position shown in FIG. 8A, the ring 16 is lifted off of the sliding pads 48 and the flight loads are carried by the locking pins 25. The loads are carried by these pins in double shear which is a substantially more efficient structure than allowing the loads to be carried by the wrap-around shoes of the prior art device of FIG. 2A. In FIG. 8B, there is shown a partial sectional view of one of the secondary fuselage attachment points. As in the case of the primary attachment points, the sliding pad 48 for the ring 16 is inserted in a secondary fuselage attachment shoe 21 which partially encloses the sliding surface 53 of the lower ring flange 55. The shoe is attached to the fuselage 10 in any known manner.

Thus it can be seen that there is described herein a wing pivot mechanism which provides a simple flexible ring which supports the wing structure in flight and also absorbs wing strains due to flight loads as well as reversed loads encountered from landing shocks. The mechanism provides these features in a simple unitary ring structure with a minimum of attachment hardware.

What is claimed is:

1. In an aircraft having a wing and a fuselage with a longitudinal axis, said wing being rotatable on a wing pivot device between a flight position with the wing span approximately orthogonal to the fuselage longitudinal axis and a stowed position with the wing span approximately parallel to the longitudinal axis of the fuselage, said wing pivot device comprising:
    a pivot ring attached to said fuselage for rotation on said fuselage about a vertical axis;
    at least one forward wing attachment member formed on the upper edge of said ring for attaching the leading portion of said wing to said ring;
    at least one aft wing attachment member formed on the upper edge of said ring for attaching the trailing portion of said wing to said ring;
    at least one forward primary fuselage attachment member formed on the lower edge of said ring for attaching the forward portion of said ring to the fuselage;
    at least one aft primary fuselage attachment member formed on the lower edge of said ring for attaching the aft portion of said ring to the fuselage;
    wing attachment assemblies connected to each of said wing attachment members for attaching said ring to said wing;
    primary fuselage attachment assemblies fixed to said fuselage and connected in sliding engagement with the lower edge of said ring, said primary attachment assemblies allowing said ring to rotate about a vertical axis of said fuselage;
    removable locking means connected to said primary fuselage attachment assemblies for selectively locking said wing to the fuselage at the primary fuselage attachment members in the flight position; and
    means for rotating said ring about a vertical axis.

2. The wing pivot device according to claim 1 wherein the ring is a unitary structure.

3. The wing pivot device according to claim 2 wherein said ring is a metallic unitary structure.

4. The wing pivot device according to claim 3 wherein said ring is stainless steel.

5. The wing pivot device according to claim 2 wherein each of said wing attachment members is vertically aligned with one of said primary fuselage attachment members and is connected to the fuselage attachment member by a radially flexible column.

6. The wing pivot device according to claim 5 wherein said ring is connected to said wing and said fuselage by means of spherical bearings.

7. The wing pivot device according to claim 5 and further comprising:
    a slider member formed along the lower edge of said ring, said slider portion being a widened portion of said ring and extending from the inside and outside peripheral surfaces of said ring;

shoe portions formed at the upper edge of said primary fuselage attachment assemblies, said shoe partially enclosing the upper surface of said ring slider member for allowing sliding rotation of said ring on said fuselage.

8. The wing point device according to claim 7 and further comprising a plurality of secondary fuselage attachment assemblies attached to said fuselage and arranged around the perimeter of said ring between said primary fuselage attachment points.

9. The wing attachment device according to claim 8 wherein each of said secondary fuselage pivot points includes a shoe portion at its upper edge, said shoe portion partially enclosing the upper surface of said ring slider member for allowing sliding rotation of said ring on said fuselage.

10. The wing pivot device according to claim 9 wherein two forward wing attachment members are provided and two aft wing attachment members are provided on said ring, said forward and aft wing attachment members being approximately equally spaced around the perimeter of the upper edge of the ring.

11. In an aircraft having a wing and a fuselage with a longitudinal axis, said wing being rotatable between a flight position with the wing span approximately orthogonal to the axis of said fuselage and a stowed position with the wing span approximately parallel to the axis of the fuselage, said wing pivot device comprising:

a pivot ring attached to said wing at two forward points and two aft points on said wing at wing attachment points on the upper edge of said ring;

a fuselage attachment slider formed on the lower surface of said ring, said slider forming a widened portion of said ring and extending from the inside and outside surfaces of the ring;

four primary fuselage attachment points on the lower edge of said ring, each of said fuselage attachment points being vertically aligned with one of said wing attachment points on the upper edge of said ring;

four primary fuselage attachment assemblies fixed to the fuselage and aligned with the fuselage attachment points of the ring when the ring is in the flight position, said fuselage attachment assemblies being in sliding engagement with the fuselage attachment slider to allow rotational sliding of the ring with respect to the fuselage;

a primary attachment pin located in each of said fuselage attachment assemblies for locking said ring in the flight position through the fuselage attachment points of the ring;

means for removing the primary attachment pins from engagement with the fuselage attachment points of the ring to allow rotation of the wing to the stowed position; and means for rotating the wing from the flight position to the stowed position.

12. The wing pivot device according to claim 11 and further comprising a columnar member connecting each wing attachment point to a corresponding fuselage attachment point, said columnar member being stiff in tension, compression and torsion and soft in restraint in a direction radial from the center of the ring.

13. The wing pivot device according to claim 12 and further comprising a plurality of secondary fuselage attachment assemblies, each secondary fuselage attachment assembly comprising a shoe which partially encloses the fuselage attachment slider in slidable engagement to allow the wing to rotate with respect to the fuselage.

14. The wing pivot device according to claim 13 and further comprising a spherical bearing in each of the wing attachment points and fuselage attachment points to provide angular movement between the attachment points and their respective attachment assemblies.

15. The wing pivot device according to claim 14 wherein said ring is a unitary structure.

16. The wing pivot device according to claim 15 wherein said ring is a metallic unitary structure.

17. The wing pivot device according to claim 16 wherein said ring is stainless steel.

* * * * *